March 4, 1952
P. H. DURAND
2,587,983
ELECTROMAGNETIC DEVICE OPERABLE
BY ALTERNATING CURRENT
Filed Jan. 7, 1950
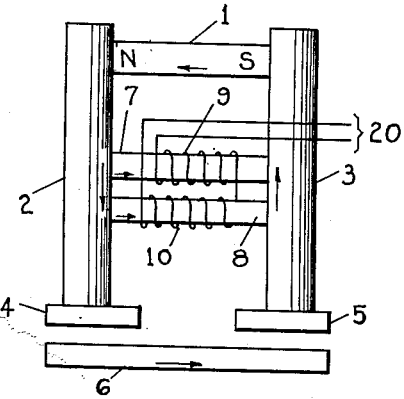
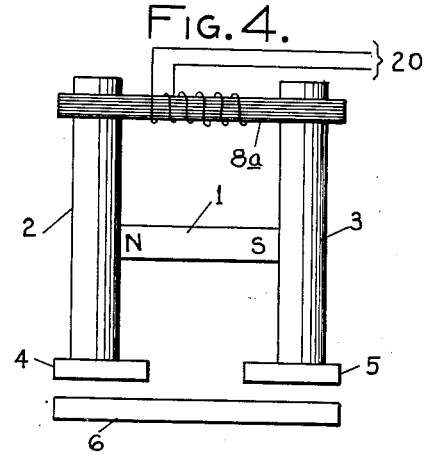
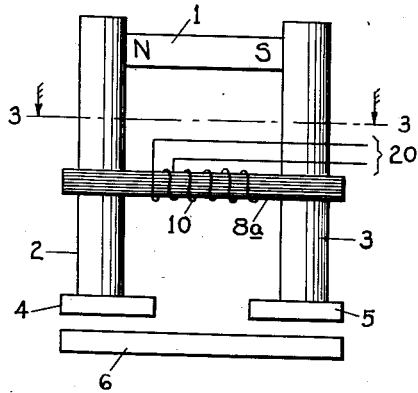
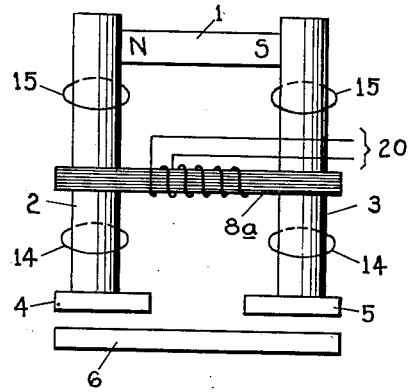
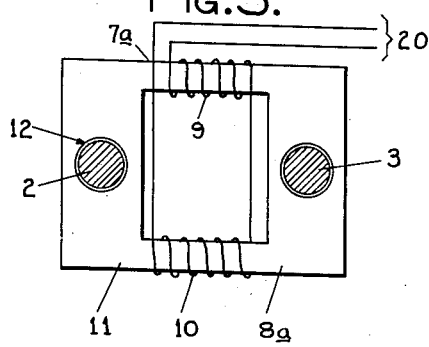
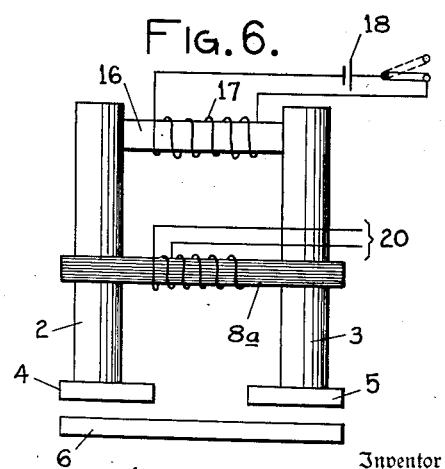
Inventor
P. H. Durand,
Neil W. Preston,
his Attorney Patented Mar. 4, 1952

2,587,983

UNITED STATES PATENT OFFICE 2,587,983

ELECTROMAGNETIC DEVICE OPERABLE BY ALTERNATING CURRENT

Paul H. Durand, Paris, France, assignor to General Railway Signal Company, Rochester, N. Y.

Application January 7, 1950, Serial No. 137,339
In France February 22, 1949

1 Claim. (Cl. 175—338)

This invention relates to electro-magnetic devices, and more particularly to such devices of the tractive armature type operated by alternating current.

When an electro-magnetic relay or like device of the tractive armature type is operated by alternating current, the armature tends to vibrate or chatter as the direction of operating flux through it reverses with the alternating of the energizing current. If the alternating energizing current is rectified, so that the operating flux through the armature is uni-directional although varying somewhat in magnitude, satisfactory operation with alternating current may be obtained.

One object of the present invention is to provide a magnetic structure for electro-magnetic devices to be energized by alternating current which will give uni-directional flux through the armature in spite of the alternating current energization, and thereby obtain satisfactory operation of the device without the use of rectifiers. Another object of the invention is to provide a simple and efficient magnetic structure for accomplishing this result.

Generally speaking, and without attempting to define the nature and scope of the invention, it is proposed to provide a magnetic structure for electro-magnetic devices which includes a permanent magnet or like source of magneto-motive-force tending to send operating flux through the armature of the device, and a pair of magnetic shunting members capable when acting together to divert enough of the permanent magnet flux from the armature to prevent its operation, together with windings on these shunting members so wound and connected as to create magneto-motive-forces in opposite directions in the respective members, so that when these windings are energized with alternating current, flux due to the permanent magnet and energization of the winding is diverted during the successive alternations of the energizing current from said shunt members alternately to pass through the armature in the same direction, thereby obtaining the desired uni-directional operating flux for the armature in spite of the alternating current energization of the windings. In such an organization, the pair of shunting members are in magnetic shunting relation with each other as well as the armature; and in order that the energization of the winding of a given shunting member may produce operating flux through the armature, and not merely increase the flux through the other shunting member, both of the shunting members have such a cross section with respect to the strength of the permanent magnet as to be substantially saturated by the permanent magnet flux alone, the reluctance of the pair of shunting members, even though individually saturated by the permanent magnet flux, being low enough to divert enough of the permanent magnet flux from the armature to prevent its operation until the windings on such shunting members are energized.

Various other objects, attributes, characteristic features and advantages of the invention will be in part apparent, and in part pointed out as the description progresses.

Although this invention may be applied to various types of electro-magnetic devices operated by alternating current, including conventional relays for opening and closing contacts, circuit controllers and contactors in general, and any apparatus where it is desirable to obtain uni-directional flux through a movable element in response to alternating current energization, it is convenient in describing the invention to assume that it is embodied in a relay structure of the conventional type; and the accompanying drawings illustrate diagrammatically typical specific embodiments of the invention for relay structures.

In the accompanying drawings:

Fig. 1 illustrates diagrammatically one form of the invention for operating a tractive type armature;

Fig. 2 illustrates a modified arrangement of the shunting members and coils;

Fig. 3 is a transverse section through the structure of Fig. 2 on the line 3—3 in Fig. 2;

Fig. 4 illustrates a modification of the shunting members and permanent magnet in different relationship;

Fig. 5 illustrates a modification of the structure of Fig. 2 employing short-circuited windings or slugs on the cores; and Fig. 6 illustrates another modification of the structure of Fig. 2 using an electro-magnet in place of the permanent magnet.

Referring first to the simplified embodiment of the invention illustrated diagrammatically in Fig. 1, the core structure for the relay comprises a permanent magnet 1 forming a back yoke to connect the ends of two spaced parallel cores 2, 3, which terminate at their other ends in enlarged pole pieces 4, 5. An armature 6, extending across these pole pieces 4, 5, is suitably supported by a pivot, or the like (not shown) for movement toward and away from these pole pieces. This armature 6 is assumed to be biased by gravity or a suitable spring to a retracted position, and to be arranged to open or close contacts as it is attracted form its biased retracted position by energization of the relay, all in accordance with well known practice.

The relay core structure of this invention also comprises a pair of magnetic bars or strips 7, 8, conveniently termed shunting members, which are connected across the cores at an intermediate point between the permanent magnet 1 and the pole pieces 4, 5, in a generally parallel relation to each other and to the permanent magnet 1 and the armature 6 and its working airgap. These shunt members 7, 8 are bolted or clamped to the cores 2, 3 in a suitable manner to provide a joint of low-magnetic reluctance.

In such a core structure, the magneto-motive-force of the permanent magnet 1 tends to send flux through the cores 2, 3, shunting members 7 and 8, and through the armature 6 and its operating airgap in a given direction, such as indicated by the arrows in Fig. 1. A cross section and material of the cores 2, 3 and the armature 6 are chosen in accordance with usual practice to provide a magnetic circuit of low reluctance, preferably having a low retentivity and hysteresis losses, for the efficient operation of the armature 6. The shunting members 7 and 8 are preferably made of a magnetic material, such as silicon steel or iron nickel alloy, which has the desired permeability, but a relatively sharp bend in its magnetization curve, so as to become substantially saturated when magnetized above a predetermined level. The cross section of these shunting members 7 and 8 and the strength of the permanent magnet are chosen in accordance with this invention such that each shunting member is substantially saturated by the permanent magnet flux through them in the direction indicated by the arrows; but the combined reluctance of the partial magnetic circuits through these shunting members 7 and 8 with respect to the permanent magnet 1 is much less than the reluctance of the magnetic circuit through the armature 6 and its operating airgaps, so that there is not enough flux through the armature to attract or hold it in its attracted position when both shunting members 7 and 8 are effective to shunt the permanent magnet flux from the armature. In other words, the parts are arranged and proportioned so that the shunting members 7 and 8 are substantially saturated by the permanent magnet flux, and the armature will not pick up or hold up unless the relay is electrically energized.

The magnetic shunting members 7 and 8 are provided with coils or windings 9 and 10 respectively; and these windings are so wound and connected in series that when energized with a current of a given polarity at terminals 20, the winding 9 for example creates a magneto-motive-force tending to send flux through its shunt member 7 in a direction opposite to the direction of the permanent magnet flux in that member, while the winding 10 on the other shunting member 8 creates a magneto-motive-force in the opposite direction tending to send flux through its shunting member in the same direction as the permanent magnet flux.

Considering now the principles and mode of operation of this invention, and referring to Fig. 1, assume that the windings 9 and 10 are energized with current of a polarity such that a magneto-motive-force created by the winding 9 tends to send flux through its shunting member 7 in a direction opposite to the direction of the permanent magnet flux indicated by the arrow, while the energization of the other winding 10 tends to send flux through its shunting member 8 in the same direction as the permanent magnet flux indicated by the arrow. The net result of such energization is to increase the flux through the armature and its airgap sufficiently to cause the armature to be attracted in opposition to its biasing force. This result may be considered as due to a decrease in the shunting effect of the shunting member 7 by the energization of its winding 9 and a diversion of the flux previously passing through this shunting member 7 into the magnetic circuit through the armature. Stated another way, the energization of the winding 9 with the polarity assumed may be said to buck out the permanent magnet flux previously being conducted by the shunting member 7, and cause this flux to become operating flux for the armature 6. In this connection, since the shunting member 8 is already substantially saturated by permanent magnet flux in the direction indicated by the arrow, and has a very high reluctance for any increase of flux in the same direction, much greater than the reluctance of the flux path through the armature and its airgap, energization of the winding 9 to reduce the permanent magnet flux in its shunting member 7 is not accompanied by a corresponding increase in flux through the other shunting member 8, but rather by an increase in flux through the armature and its airgaps.

At the same time the winding 9 is energized with the polarity assumed, current also flows through the winding 10 to create a magneto-motive-force tending to send the flux through its shunting member 8 in the same direction as the permanent magnet flux; but since this shunting member 8 is already substantially saturated for flux in this direction, such energization of the winding 10 has little effect in causing any change in flux distribution.

Energization of the winding 9 with the polarity under consideration above the level where its magneto-motive-force in the shunting member 7 is greater than the magneto-motive-force of the permanent magnet, will cause electro-magnetic flux created by such energization of the winding 9 to build up through its shunting member 7 and through the armature, until the shunting member 7 again becomes saturated for the opposite direction of flux. In other words, the attractive force on the armature upon energization of the windings 9 and 10 corresponds with the permanent magnet flux that may be diverted to the armature from the shunting member 7, together with such supplemental electro-magnetic flux that may be created by the energization of the winding 9, dependent upon the degree of energization of this winding with respect to the strength of the permanent magnet, and the relationship and proportion of the parts. Thus, the operating flux acting on the armature may be said to be varied by regulating the energizing current for the relay, and the increase in flux through the armature is, within certain limits, proportional to the energizing current.

Assuming now that the windings 9 and 10 are energized with a polarity opposite to the one previously assumed, the winding 10 is now energized with current in a direction to create a magneto-motive-force opposing the permanent magnet flux in its shunting member 8, while the other winding 9 is energized with current in a direction tending to increase the permanent magnet flux in its shunting member 7. In other words, a change in polarity merely reverses the functions of the shunting members 7 and 8 and their windings 9 and 10. In both cases, however, the direction of flux through the armature remains the same. This is because the permanent magnet always tends to send its flux through the armature 6 in the same direction, and energization of either winding 9 or 10 with the proper polarity to divert permanent magnet flux into the armature 6 creates a flux in the same direction through the armature 6.

Consequently, if the windings 9 and 10 are energized with alternating current, the shunting members 7 and 8 and their associated windings 9 and 10 are alternately effective to provide operating flux through the armature in the same direction during the successive alternations of the energizing current; and the resultant uni-directional flux through the armature acts to produce the desired operation without the vibration and chatter likely to exist when the direction of flux through the armature reverses with the alternations of the energizing current. Since the shunt members are comparable in their shunting effect and conditions of saturation, and their windings 9 and 10 are alike, the uni-directional operating flux through the armature is substantially the same for the successive half cycles of the alternating current.

The shunting members 7 and 8 and their windings 9 and 10 are shown in Fig. 1 one above the other to facilitate an explanation and understanding of the invention; but the construction preferably employed is illustrated in Figs. 2 and 3, in which the shunting members 7a and 8a are arranged side by side in the same plane transversely of the cores 2 and 3, as parallel core portions of restricted cross section of a single magnetic element 11 connected across these cores 2 and 3. The element 11, having the shunting members 7a and 8a, is preferably a stacking of laminations stamped out of sheet metal stock, with two circular holes 12 closely fitting over the cylindrical cores 2 and 3. This affords a laminated structure for reducing the eddy current losses due to the alternations of the flux in the shunting members 7a and 8a. These shunting members 7a and 8a of Figs. 2 and 3 have coils or windings 9 and 10 thereon wound and connected in series in the same way explained for the structure of Fig. 1; and the device of Figs. 2 and 3 operates in the same manner previously explained.

Fig. 4 illustrates another modification in which the permanent magnet 1 is connected to the cores 2 and 3 at an intermediate point, while the shunting members 7a and 8a of Figs. 2 and 3 are located at the upper ends of these cores.

In the modification shown in Fig. 5, copper rings or slugs 14, or some equivalent arrangement of electrical conductors in a closed circuit of low resistance, are provided around the cores 2 and 3 adjacent the armature 6, in order to reduce the variations in the uni-directional flux through the armature as the amplitude of the alternating current changes. Current induced in these copper rings 14 by variations in flux through the armature acts in accordance with well known principles to create a flux tending to oppose such flux variations, thereby giving a more uniform intensity of operating flux through the armature as the instantaneous energizing current through the windings 9 and 10 varies. These copper rings 14 surround or encircle the whole cross section of the cores 2 and 3, and are different in purpose and function from the so-called shading rings often used with the cores of alternating current devices. If desired, similar copper rings or slugs 15 may be applied to the upper portions of the cores 2 and 3, as indicated in Fig. 5, in order to reduce any demagnetizing effect upon the permanent magnet on account of the varying magneto-motive-forces created by the alternating current energization of the windings 9 and 10.

Fig. 6 illustrates another modification of the structure of Figs. 2 and 3, in which a soft iron back yoke 16, with a coil or winding 17 thereon energized from a suitable source of direct current, indicated as a battery 18, is employed as a source of magneto-motive-force instead of the permanent magnet 1.

In the foregoing discussion it was assumed that the relay is energized by alternating current, but similar operations will occur when the relay is energized with direct current of alternate polarity. When the polarity of direct current energization of the relay of this invention is quickly reversed, the armature does not release, since the direction of flux through it is not changed; and this operating characteristic may be used to advantage in connection with polarized line circuits and the like where it is desirable to maintain the armature of a relay in its attracted position when the polarity of the circuit is reversed.

From the foregoing it can be seen that this invention provides an electro-magnetic structure which may be energized with alternating current, or currents of alternated polarity, and yet will provide a uni-directional flux through an armature or other movable element. This operating characteristic is particularly useful to avoid armature chatter or vibration in relays and similar devices of the tractive armature type, enabling efficient and quiet operation to be obtained by alternating current energization without the use of rectifiers, and may be utilized to advantage in other types of apparatus where magnetization of some movable element with uni-directional flux in response to alternating current energization may be desirable.

The particular structures shown and described are merely typical embodiments of the invention; and various modifications, adaptations and additions may be made in the structures and arrangements of parts herein disclosed without departing from the scope of the invention.

What I claim is:

An electro-magnetic device of the tractive armature type operable by alternating current comprising, a stacking of laminations formed with end pieces connected by a pair of parallel shunt members, a permanent magnet applying a magneto-motive-force to the mid-points of said end pieces, windings on said shunt members wound and connected together to create when energized with a given polarity magneto-motive-forces tending to send flux in opposite directions through said shunt members, a pair of soft iron cores connected to the respective mid-points of said end pieces of the laminated stacking and terminating in enlarged pole pieces, a movable armature spanning said pole pieces and biased to a retracted position, said shunt members having a cross-section proportioned with respect to the strength of the permanent magnet to be substantially saturated by flux from the permanent magnet alone, said shunt members although saturated diverting sufficient permanent magnet flux to leave in the flux paths from the ends of the respective shunt members through said cores and pole pieces relatively little flux and insufficient to attract said armature, said windings when energized with alternating current acting alternately on successive half-cycles to oppose the permanent magnet flux in their respective shunt members and produce an operating flux through said cores and armature on the successive half cycles, said shunt members and permanent magnet being disposed in a symmetrical relation to the paths of operating flux through the armature and thereby causing substantially the same amount of armature operating flux on the successive half cycles of alternating current energizing said windings.

PAUL H. DURAND.

REFERENCES CITED

The following references are of record in the file of this patent:

UNITED STATES PATENTS

| Number | Name | Date |
| --- | --- | --- |
| 1,890,525 | Martin | Dec. 13, 1932 |
| 1,899,502 | Hachfeld | Feb. 28, 1933 |
| 2,027,221 | Bostwick | Jan. 7, 1936 |
| 2,096,929 | Willing | Oct. 26, 1937 |
| 2,140,576 | Fisher | Dec. 20, 1938 |
| 2,336,782 | Eckhardt | Dec. 14, 1943 |
| 2,416,681 | Dickten | Mar. 4, 1947 |

OTHER REFERENCES

Applied Electronics, page 289, by the E. E. Staff of MIT, The Technology Press, John Wiley and Sons, New York, 1943.

Electromagnetic Devices, by H. C. Roters, pages 362–365, John Wiley and Sons, 1941.